(12) United States Patent
Park et al.

(10) Patent No.: US 8,943,896 B2
(45) Date of Patent: Feb. 3, 2015

(54) PRESSURE TRANSDUCER USING CERAMIC DIAPHRAGM

(71) Applicant: Auto Industrial Co., Ltd., Seoul (KR)

(72) Inventors: Kyong M. Park, Westlake Village, CA (US); Si-Dong Kim, Seoul (KR)

(73) Assignee: Auto Industrial Co., Ltd., Seoul (KR)

( * ) Notice: Subject to any disclaimer, the term of this patent is extended or adjusted under 35 U.S.C. 154(b) by 28 days.

(21) Appl. No.: 13/648,624

(22) Filed: Oct. 10, 2012

(65) Prior Publication Data

US 2014/0096615 A1 Apr. 10, 2014

(51) Int. Cl.
*G01L 9/04* (2006.01)
*G01L 7/00* (2006.01)

(52) U.S. Cl.
USPC .................................. 73/726; 73/700; 73/715

(58) Field of Classification Search
None
See application file for complete search history.

(56) References Cited

U.S. PATENT DOCUMENTS

| | | | |
|---|---|---|---|
| 4,481,497 A | 11/1984 | Kurtz et al. | |
| 4,793,189 A * | 12/1988 | Dell'Orto et al. | 73/775 |
| 4,941,359 A * | 7/1990 | Quinn et al. | 73/851 |
| 4,991,283 A * | 2/1991 | Johnson et al. | 29/595 |
| 5,824,909 A * | 10/1998 | Kathan et al. | 73/706 |
| 5,880,371 A * | 3/1999 | Beringhause et al. | 73/718 |
| 5,892,156 A * | 4/1999 | Kathan et al. | 73/706 |
| 2004/0040382 A1 | 3/2004 | Peterson et al. | |
| 2004/0200291 A1 | 10/2004 | Dai et al. | |
| 2013/0263670 A1 | 10/2013 | Selders et al. | |

FOREIGN PATENT DOCUMENTS

| | | |
|---|---|---|
| DE | 2001-0105085 A1 | 6/2012 |
| JP | 61-65126 A | 4/1986 |
| JP | 06-058335 | 8/1994 |
| JP | 8-240500 A | 9/1996 |
| JP | 2001-507801 | 6/2001 |
| KR | 10-0240012 | 1/2000 |
| KR | 2001-0105085 A | 11/2001 |
| KR | 10-2001-0105085 | 4/2002 |

(Continued)

OTHER PUBLICATIONS

Korean Office Action issued Oct. 30, 2013 in counterpart Korean Patent Application No. 10-2012-0114992. (7 pages including English translation).

(Continued)

*Primary Examiner* — Lisa Caputo
*Assistant Examiner* — Jermaine Jenkins
(74) *Attorney, Agent, or Firm* — NSIP Law (57) ABSTRACT

A pressure transducer using a ceramic diaphragm which is not easily damaged so that there is no risk of leakage of a target medium to be measured, having a superior mass-production capability and a reduced volume and enabling low-price by simplifying a flexible cable and a printed circuit board (PCB) to connect the transducer and a signal processing chip. The pressure transducer includes the ceramic diaphragm formed as a rectangular planar ceramic diaphragm and having a surface having formed thereon a pattern made of an electrically conductive material and strain gages; a base plate configured to face the surface of the ceramic diaphragm having formed thereon the pattern; and an adhesive layer configured to be formed along edges of a contacting surface of the ceramic diaphragm and the base plate so as to bond the ceramic diaphragm and the base plate and form a space for the strain gages.

4 Claims, 8 Drawing Sheets

(56) References Cited

FOREIGN PATENT DOCUMENTS

| | | |
|---|---|---|
| KR | 10-2012-0015201 A | 2/2012 |
| WO | WO 98/29722 | 7/1998 |

OTHER PUBLICATIONS

European Search Report issued Jan. 20, 2014 in counterpart European Patent Application No. 13187201.2. (3 pagees in English).

\* cited by examiner

PRESSURE TRANSDUCER USING CERAMIC DIAPHRAGM

BACKGROUND

1. Field

The following description relates to a pressure transducer using a ceramic diaphragm, and more particularly, to a pressure transducer using a ceramic diaphragm, which is not easily damaged so that there is no risk of leakage of a target medium to be measured, having a superior mass-production capability and a reduced volume and enabling low-price by simplifying a flexible cable and a printed circuit board (PCB) to connect the transducer and a signal processing chip.

2. Description of the Related Art

Generally, a pressure transducer is used for various fields, such as industrial fields and civil engineering fields, which require a high level of precision to accurately measure a wide range of pressure. The pressure transducer includes strain gages for pressure measurement.

A strain gage may be categorized into an electrical strain gage that electrically measures the strain of an object and a mechanical strain gage that mechanically measures the strain. The electrical strain gage measures a deformation rate of an object from the change of an electrical resistance of the strain gage which is caused when the object deforms. The mechanical strain gage detects a slight change in distances between two points and measures a deformation rate of an object to be measured from the detected distance change. With the introduction of the strain gages, deformation of an object can be precisely measured, and it is possible to estimate stress from the measured deformation.

As the high-tech core technologies have been digitized, diversified and capable of high-performance, there has been a worldwide increasing need for a pressure transducer in various fields, and hence many countries have launched pressure transducer technology development projects as an important high-tech business and provided intensive support to research and development projects, whereby the level of technique has been further increased and the establishment of the mass-production system could be realized. As a result, it is feasible to produce a compact, smart pressure transducer at a lower price.

As a conventional pressure transducer, a pressure transducer using a stainless diaphragm (Korean Patent Registration No. 10-240012) is used. However, because the fabricating processes of the stainless diaphragm for the conventional pressure transducer are complicated and a gage is attached manually, the manufacturing process is complicated and thus the manufacturing costs are increased. In addition, if the gage is exposed to the air or to a medium (liquid or gas) to be measured, it is easy to corrode, which may result in deterioration of long-term stability or reliability of the gage. Further, if a metal thin film strain gage is broken, the entire pressure transducer needs to be replaced, and the stainless diaphragm is not suitable to measure a pressure of a corrosive gas and liquid.

To overcome the aforementioned drawbacks, Korean Laid-Open Patent No. 2001-0105085 discloses a pressure transducer using a ceramic diaphragm that is formed to have thereon a high-resistance thick film or a thin film gage, which is air-tightly sealed by a ceramic cap or coated with a protective layer of a special insulating coating, whereby the pressure transducer can be used for both a gas and liquid and have superior anti-corrosion properties.

Figure 5:
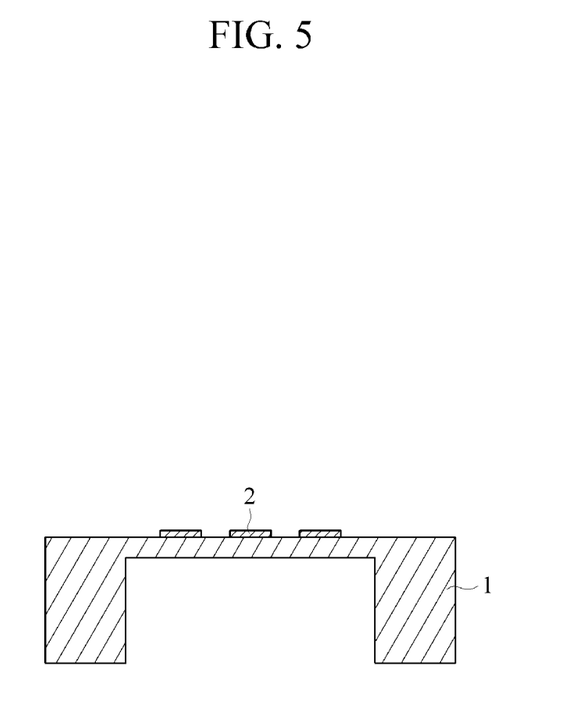
FIG. 5 is a cross-sectional view of an example of a conventional pressure transducer using a ceramic diaphragm.

However, in a conventional pressure transducer using a ceramic diaphragm as shown in FIG. 5, the ceramic diaphragm 1 is made of ceramic, which may be damaged when excessive pressure is exerted thereon, and thus may cause a serious risk of leakage of a medium to be measured. Especially, if the medium is a toxic gas, the leakage of the medium may result in severe consequences.

Figure 6:
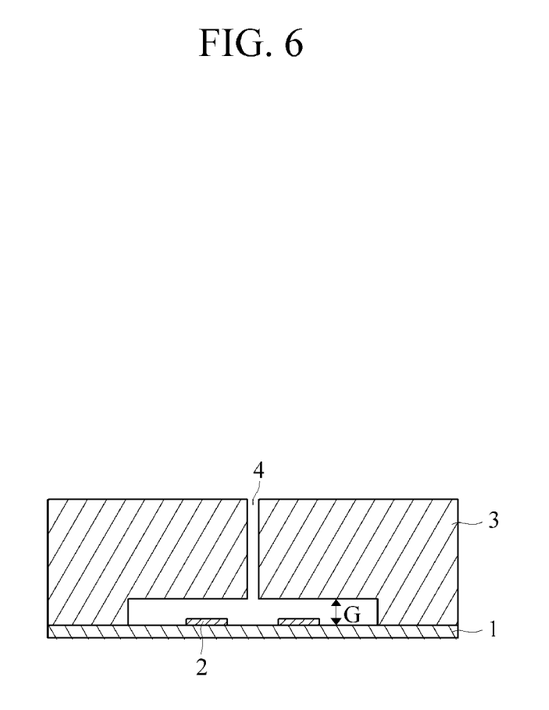
FIG. 6 is a cross-sectional view of another example of a conventional pressure transducer using a ceramic diaphragm.

In addition, in a case of a pressure transducer using a ceramic diaphragm as shown in FIG. 6, there is a limitation in reducing a gap G for strain gages 2 when mechanically processing a base plate 3. It is almost impossible to fabricate the base plate 3 to have a gap G that is equal to or less than 10 μm. Thus, when the ceramic diaphragm 1 is significantly bent due to an excessive pressure applied thereon, the wide gap G prevents the ceramic diaphragm 1 from contacting the base plate 3, which may lead to the ceramic diaphragm 1 being broken. The broken ceramic diaphragm 1 may result in the leakage of a medium, which is to be measured, through a venting groove.

Figure 7A:
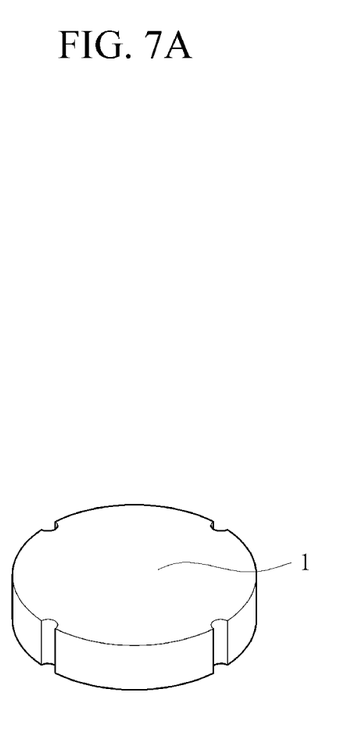
FIG. 7A is a top perspective view of a conventional ceramic diaphragm.
Figure 7B:
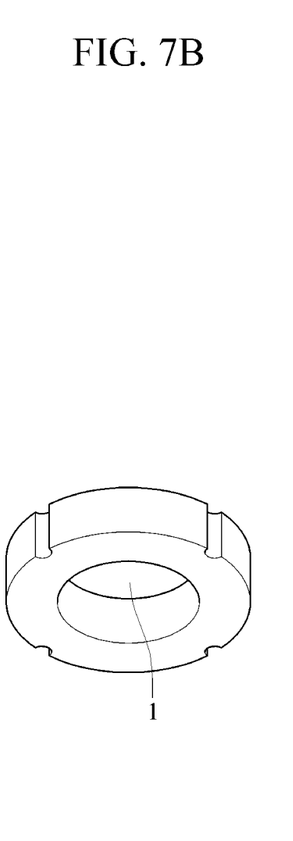
FIG. 7B is a bottom perspective view of the conventional ceramic diaphragm.

Moreover, the pressure transducers using a ceramic diaphragm, as shown in FIGS. 5 and 6, use a circular-shaped ceramic diaphragm 1 as shown in FIGS. 7A and 7B, which is not effective for mass-production. Accordingly, the price of the pressure transducer is increased. Furthermore, since flexible cables (not shown) and a printed circuit board (PCB) (not shown) to connect the transducer and a signal processing chip have to be fabricated to fit the shape and size of the circular ceramic diaphragm 1, it causes an increase in volume and cost of the pressure transducer.

RELATED ART DOCUMENTS

Patent Documents

1. Korean Patent Registration No. 10-240012
2. Korean Laid-Open Patent No. 2001-0105085

SUMMARY

The following description relates to a pressure transducer using a ceramic diaphragm, which is not easily damaged, having a superior mass production and reduced volume and enabling low price.

In one general aspect, there is provided a pressure transducer using a ceramic diaphragm, comprising: the ceramic diaphragm formed as a rectangular planar ceramic diaphragm and having a surface having formed thereon a pattern made of an electrically conductive material and strain gages; a base plate configured to face the surface of the ceramic diaphragm having formed thereon the pattern; and an adhesive layer configured to be formed along edges of a contacting surface of the ceramic diaphragm and the base plate so as to bond the ceramic diaphragm and the base plate and form a space for the strain gages.

The base plate may have a thickness thicker than a thickness of the ceramic diaphragm and have a length shorter than a length of the ceramic diaphragm.

A thickness of the adhesive layer may be smaller than 10 μm.

The adhesive layer may be made of low-melting glass.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
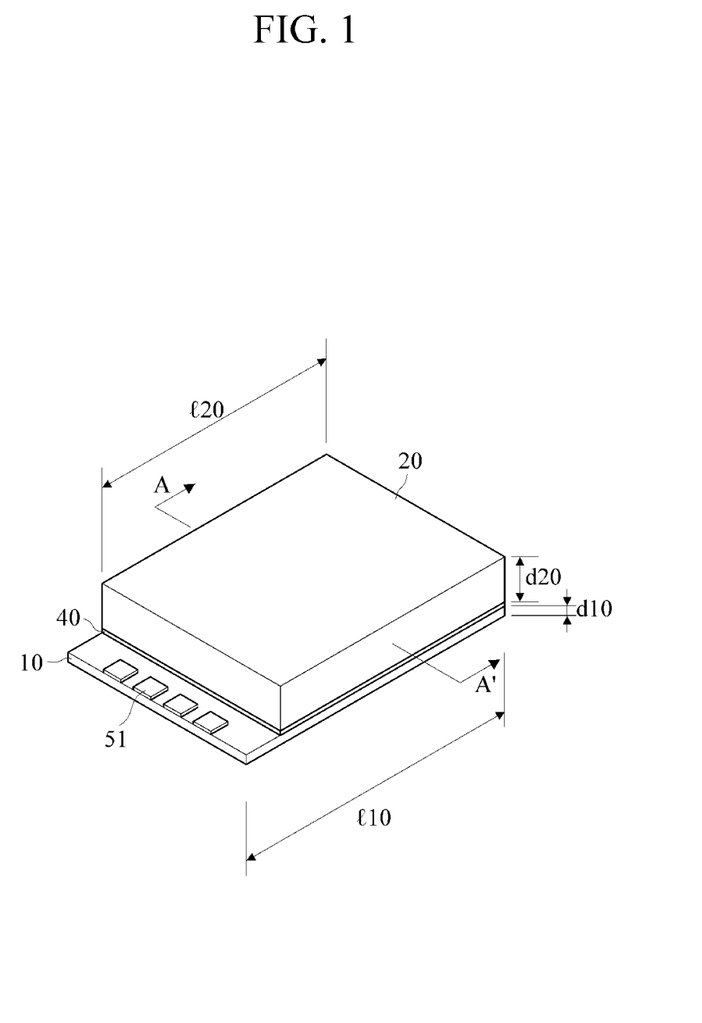
FIG. 1 is a perspective view of a pressure transducer using a ceramic diaphragm according to an exemplary embodiment of the present invention.
Figure 2:
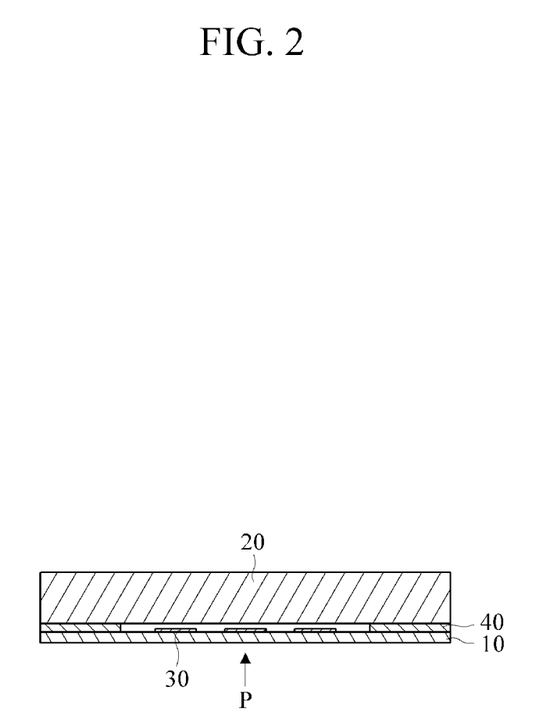
FIG. 2 is a cross-sectional view of the pressure transducer taken along line A-A' of FIG. 1.

FIG. 1 is a perspective view of a pressure transducer using a ceramic diaphragm according to an exemplary embodiment of the present invention. FIG. 2 is a cross-sectional view of the pressure transducer taken along line A-A' of FIG. 1. Referring to FIGS. 1 and 2, the pressure transducer using a ceramic diaphragm includes a ceramic diaphragm 10, a base plate 20 facing the ceramic diaphragm 10, and an adhesive layer 40. The ceramic diaphragm is a rectangular planar ceramic diaphragm having a surface on which a pattern 50 (see FIG. 4) made of an electrically conductive material and strain gages 30 are formed. The base plate 20 faces the surface of the ceramic diaphragm on which the pattern 50 is formed, and the adhesive layer 40 is disposed along the edges of the facing surfaces of the ceramic diaphragm 10 and the base plate 20 to bond together the ceramic diaphragm 10 and the base plate 20 and to form a space for the strain gages 30.

One of the most important characteristics of the pressure transducer according to the exemplary embodiment is that the ceramic diaphragm 10 and the base plate 20 are bonded by the adhesive layer 40 that is formed along the edges of the ceramic diaphragm 10 and the base plate 20. The adhesive layer 40 may be first formed either on the ceramic diaphragm 10 along the edges or on the base plate 20 along the edges, and then one can be attached to the other. Alternatively, the ceramic diaphragm 10 and the base plate 20 may be arranged facing each other at a predetermined distance and be bonded together by the adhesive layer 40 disposed along the edges of the facing ceramic diaphragm 10 and the base plate 20.

Accordingly, there is no risk of damaging the ceramic diaphragm 10 even when an excessive pressure is applied to the pressure transducer, and thus the leakage of a measurement target medium is prevented, and thereby the reliability and safety can be ensured.

More specifically, a conventional pressure transducer illustrated in FIG. 6 has a limitation in reducing a gap G for a space between a base plate 3 and strain gages 2 when mechanically manufacturing the base plate 3. Accordingly, when an excessive pressure is applied to a ceramic diaphragm 1, causing the ceramic diaphragm 1 to be severely bent, the ceramic diaphragm 10 may not be able to contact the base plate 3 due to the wide gap G, and thereby being damaged. In a case where the ceramic diaphragm 10 is damaged or broken, a measurement target medium may leak through a venting hole 4. On the contrary, the pressure transducer using the ceramic diaphragm in accordance with the exemplary embodiment of the present invention uses an adhesive, the thickness of which is easy to control, so that it is possible to form the gap G to be equal to or narrower than 10 μm. Hence, even when an excessive pressure is applied, the ceramic diaphragm 10 is able to contact the base plate 20, and thereby there is no risk of damaging the ceramic diaphragm 10 and the measurement target medium is prevented from leaking. Accordingly, the safety and reliability of the pressure transducer can be ensured.

The thickness of the adhesive layer 40 may desirably but not necessarily be smaller than 10 μm. In addition, various types of adhesive may be used for the adhesive layer 40 as long as the adhesive does not affect the effects of the present invention, and examples of the adhesive suitable for use may include low-melting glass and glass frit.

In addition, because the ceramic diaphragm 10 and the base plate 20 are bonded by the adhesive layer 40, manufacturing time and process can be far more reduced as compared to the conventional mechanical processes of manufacturing the base plate 3 (see FIG. 6) to form the gap G for the strain gages 2 or of manufacturing a ceramic diaphragm 1 (see FIG. 5) for a pressure introducing portion.

Therefore, less cost is required for manufacturing the pressure transducer according to the exemplary embodiment of the present invention, when compared to the conventional pressure transducer, and thus it may have the advantage of low-cost production.

Referring back to FIG. 1, reference numeral 51 represents terminal solder pads, which are electrically connected to the pattern 50 formed on the ceramic diaphragm 10.

Another important characteristic of the pressure transducer in accordance with the exemplary embodiment of the present invention is that only on a surface of the rectangular planar ceramic diaphragm 10, the pattern 50 formed of the electrically conductive material and the strain gages 30 are formed. For this configuration, a length 120 of the base plate 20 is shorter than a length 110 of the ceramic diaphragm 10 having the pattern formed thereon. That is, by configuring the ceramic diaphragm 10 to be longer than the base plate 20, the terminal solder pads 51 are disposed only on the ceramic diaphragm 10 to electrically connect the strain gages 20 and the pattern 60 formed of the electrically conductive material.

Conventionally, patterns are formed on both a ceramic diaphragm and a base plate and thereafter, the ceramic diaphragm and the base plate are connected to each other by conductive epoxy resin, whereas in the exemplary embodiment of the present invention, the pattern formed of an electrically conductive material is disposed only on the ceramic diaphragm and thus it is possible to manufacture the pressure transducer without forming the pattern on the base plate and without using conductive epoxy resin. As a result, the manufacturing process can be simplified, and thereby significantly reduce the manufacturing cost.

Further, the shape of the base plate 20 may be a rectangular plane that corresponds to the rectangular planar ceramic diaphragm 10, and a thickness d20 of the base plate 20 may be thicker than a thickness d10 of the ceramic diaphragm 10. The length l10 of the rectangular planar ceramic diaphragm 10 is longer than the length l20 of the base plate 20. However, the difference between the lengths l10 and l20 may be only long enough for the terminal solder pads 51 to be formed as protruding from the base plate 20 and to function normally.

In addition, the strain gages 30 may be formed by evaporating a CuNi or NiCr thin film on the ceramic diaphragm 10 by use of ion-beam sputtering, and then by patterning the film with photolithography process. Various well-known patterning methods may also be used.

Figure 4:
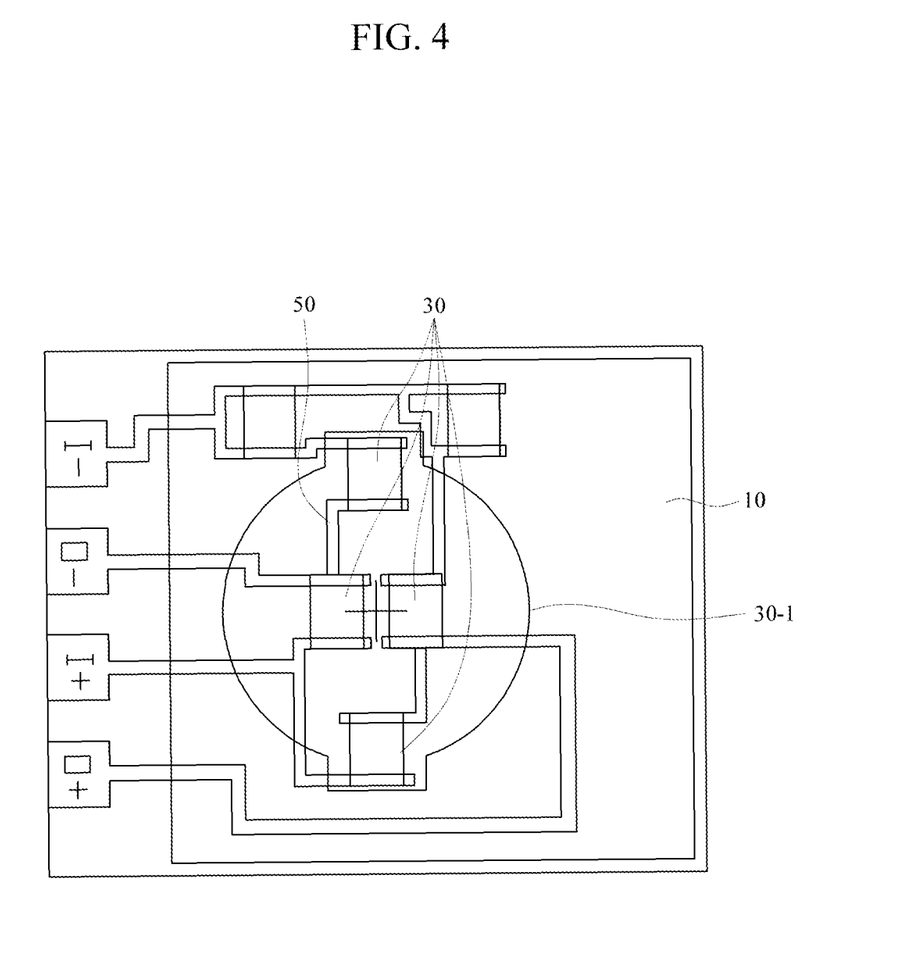
FIG. 4 is a top view of a ceramic diaphragm having a pattern and strain gages formed thereon according to the exemplary embodiment of the present invention.

The pressure transducer converts a pressure into a resistance change of the strain gages 30, and it is important to convert the pressure into the effective change of the strain gages 30. In response to a uniform pressure being exerted on the diaphragm 10 which has its outer surface fixed, a bent strain is imposed on the surface, and a small change which is applied to the back surface of the diaphragm 10 by the application of the pressure may cause a Wheatstone bridge consisting of four strain gages 30 to detect a small resistance change and to convert the detected small resistance change into an electrical signal. There are various patterns of strain gages to effectively detect a bent strain imposed on the diaphragm 10 that is fixed by the pressure. In the exemplary embodiment of the present invention, the strain gages 30 are formed by printing a thick film resistor. FIG. 4 is a top view of an example of the ceramic diaphragm for the pressure transducer, having a pattern 50 and four strain gages 30 formed thereon. Two of the strain gages 30 may be placed at a central portion of the diaphragm 10 that is most likely to be deformed in the central direction of a diaphragm circle 30-1 and the remaining two strain gages 30 may be placed over the edges of the diaphragm circle 30-1 which are most likely to be deformed in the circumferential direction of the diaphragm circle 30-1.

In addition, the diaphragm 10 is made of ceramic to electrically isolate the strain gages 30 from the diaphragm 10. A resistance value of the strain gages 30 may be controlled between 100Ω and 1000Ω by adjusting a thickness of a thin film and lengths of the gages 30.

Figure 3:
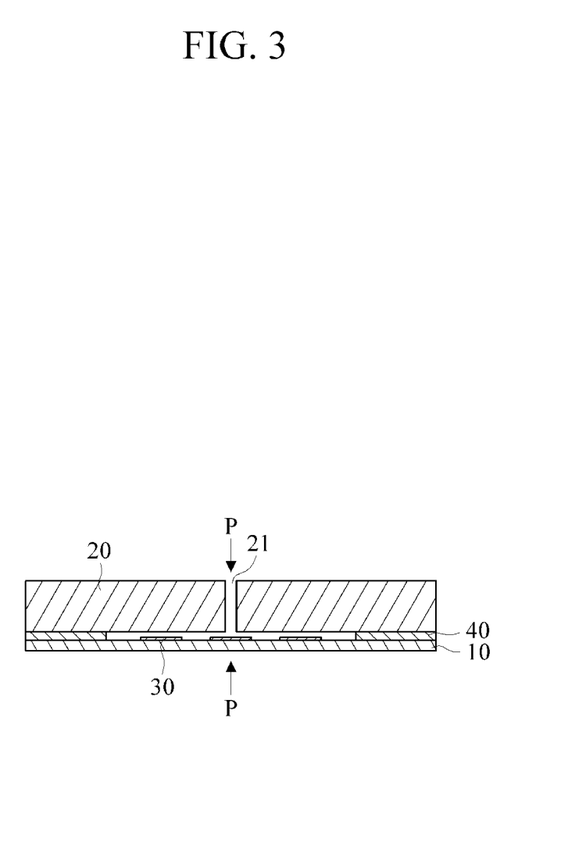
FIG. 3 is a cross-sectional view of a pressure transducer using a ceramic diaphragm according to another exemplary embodiment of the present invention.

FIG. 2 is a cross-sectional view of the pressure transducer taken along line A-A' of FIG. 1, and FIG. 3 is a cross-sectional view of a pressure transducer using a ceramic diaphragm according to another exemplary embodiment of the present invention. "P" represents a pressure introducing portion.

Although not illustrated in FIGS. 2 and 3 which depict the essential elements of the pressure transducer, a simplified flexible cable with a reduced volume is formed on a top of the base plate 20 and a signal processing integrated circuit (IC) chip is mounted on the flexible cable. The signal processing IC chip may be an application specific integrated circuit (ASIC). Hence, the pressure transducer using a ceramic diaphragm enables to implement the small volume and a compact structure of the flexible cable and thereby to simplify the flexible cable, which contributes to the low price of the pressure transducer.

The pressure transducer using the ceramic diaphragm shown in FIG. 2 is a transducer to measure a pressure with respect to an absolute vacuum. Generally, one portion of the diaphragm on which a pressure is applied is closed to form a reference vacuum chamber, and a pressure to be measured is introduced into the other portion. A degree of vacuum is an absolute reference for the transducer, and since it is not possible to adjust the absolute reference after the manufacturing, deterioration of the degree of vacuum due to leakage may cause the degradation of transducer performance. Thus, a leakage test or a vacuum-sealing process needs to be performed with great care. To this end, a base plate 20 having a plurality of lead lines (not shown) and the ceramic diaphragm 10 having the strain gages 30 formed thereon are attached together by the adhesive layer 40 to air-tight seal the strain gages 30.

In addition, in FIG. 3, a gage pressure transducer as the pressure transducer using a ceramic diaphragm is to measure a gage pressure with reference to an ambient pressure, or a differential pressure transducer as the pressure transducer is to measure a difference between two pressures. For such measurement, a venting groove 21 is formed on the base plate.

In the exemplary embodiment of the present invention, the ceramic diaphragm 10 and the base plate 20 may be desirably, but not necessarily, a rectangular plane, so that mass production of the pressure transducer and reduction of manufacturing costs can be achieved.

More specifically, since a conventional pressure transducer has a circular ceramic diaphragm and a circular base plate as shown in FIGS. 7A and 7B, its massive production is very difficult, resulting in an increase in the price of the pressure transducer. In contrast, the pressure transducer using a ceramic diaphragm in accordance with the exemplary embodiment of the present invention includes the rectangular planar ceramic diaphragm and the rectangular planar base plate, and thus high mass production of the pressure transducer is feasible and thereby the price of the pressure transducer can be reduced.

As described above, it is possible to provide a pressure transducer using a ceramic diaphragm, which is not easily damaged so that there is no risk of leakage of a target medium to be measured, having a superior mass-production capability and a reduced volume and enabling low-price by simplifying a flexible cable and a printed circuit board (PCB) to connect the transducer and a signal processing chip.

In addition, since a pattern formed of an electrically conductive material is disposed only on the ceramic diaphragm and thus it is possible to manufacture the pressure transducer without forming the pattern on the base plate and without using conductive epoxy resin. As a result, the manufacturing process can be simplified, and thereby significantly reduce the manufacturing cost.

The pressure transducer using a ceramic diaphragm may be applicable to various fields, such as industrial fields and civil engineering fields, which require a high level of precision to accurately measure a wide range of pressure.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A pressure transducer using a ceramic diaphragm, comprising:
   the ceramic diaphragm formed as a rectangular planar ceramic diaphragm and having a surface having formed thereon a pattern made of an electrically conductive material and strain gages,
      wherein the ceramic diaphragm comprises a Wheatstone bridge consisting of four strain gages,
      wherein two of the strain gages may be placed at a central portion of the diaphragm that is most likely to be deformed in the central direction of a diaphragm circle and the remaining two strain gages may be placed over the edges of the diaphragm circle which are most likely to be deformed in the circumferential direction of the diaphragm circle;

a base plate configured to face the surface of the ceramic diaphragm having formed thereon the pattern; and an adhesive layer configured to be formed along edges of a contacting surface of the ceramic diaphragm and the base plate so as to bond the ceramic diaphragm and the base plate and form a space for the strain gages.

2. The pressure transducer of claim 1, wherein the base plate has a thickness thicker than a thickness of the ceramic diaphragm and has a length shorter than a length of the ceramic diaphragm.

3. The pressure transducer of claim 1, wherein a thickness of the adhesive layer is smaller than 10 μm.

4. The pressure transducer of claim 1, wherein the adhesive layer is made of low-melting glass.

* * * * *